United States Patent [19]

Dunn

[11] 3,742,498

[45] June 26, 1973

[54] SYNCHRONIZATION AND POSITION LOCATION SYSTEM

[75] Inventor: James G. Dunn, Montclair, N.J.

[73] Assignee: International Telephone and Telegraph Corporation, Nutley, N.J.

[22] Filed: May 6, 1970

[21] Appl. No.: 35,049

[52] U.S. Cl. .................. 343/7.5, 179/15 BS, 325/4, 343/100 ST

[51] Int. Cl. .............................................. H04b 7/20

[58] Field of Search ............ 343/7.5, 6.5 R, 5.6 LC, 343/112 TC, 100 ST; 179/15 BS; 325/4

[56] References Cited

UNITED STATES PATENTS

| | | | |
|---|---|---|---|
| 3,430,237 | 2/1969 | Allen | 343/7.5 |
| 3,418,579 | 12/1968 | Hultberg | 325/52 |
| 3,434,140 | 3/1969 | Chisholm | 343/6 |
| 3,544,995 | 12/1970 | Bottenberg et al. | 343/112 TC |

*Primary Examiner*—Benjamin A. Borchelt
*Assistant Examiner*—G. E. Montone
*Attorney*—C. Cornell Remsen, Jr., Walter J. Baum, Paul W. Hemminger, Charles L. Johnson, Jr., Philip M. Bolton, Isidore Togut, Edward Goldberg and Menotti J. Lombardi, Jr.

[57] ABSTRACT

A master station and N slave stations include synchronization equipment to enable each of the stations to have access to a common repeater in a different one of M time slots of a TDM format at the repeater, there being motion between the master and slave stations and the repeater. Each time slot is employed on a push-to-talk basis for N/M slave stations. The master station propagates a reference sync burst through the repeater. Each of the stations receive this master sync burst from the repeater. The master station adjusts the frequency of the timing signals therein to compensate for the doppler shift experienced in the propagation path from the master station to the repeater and each of the slave stations adjusts the frequency of the timing signals therein to compensate for the doppler shift experienced in the propagation path from each of the slave stations to the repeater so that the desired frequency of the timing signals is present at the repeater. The master station in response to the received master sync adjusts its timing signals so that the signals propagated therefrom arrive in the proper time slot of the TDM format at the repeater. Each of the slave stations propagate a different low power level, psuedo noise code ranging signal through the repeater to the master station. The phase information of this ranging signal is detected in the master station, coded, and transmitted to the appropriate one of the slave stations. This phase information is responded to in the appropriate slave station to adjust the phase of its timing signals so that data bursts of each of the slave stations appear in the proper time slot of the TDM format at the repeater. The ground station responds to the phase of the received master reference signal and the phase information of the ranging signal to provide a measure of the satellite-to-slave station range at the ground station. In a single satellite system, the altitude of the slave stations and the rate of change or range, obtained from measuring the doppler of the carrier signal received at the associated slave station and is transmitted to the ground station in slow speed data channels provided during the synchronizing interval of each of the data bursts. These two bits of information together with the satellite-to-slave station range enables the ground station to locate the position of a particular slave station. In a two satellite system, the equipment for determining the satellite-to-slave station range is duplicated for cooperation with a second satellite so that the altitude of the slave station and the satellite-to-repeater range for both satellites enable the position location of a particular slave station at the ground station.

10 Claims, 5 Drawing Figures

United States Patent [19]
Dunn
[11] 3,742,498
[45] June 26, 1973
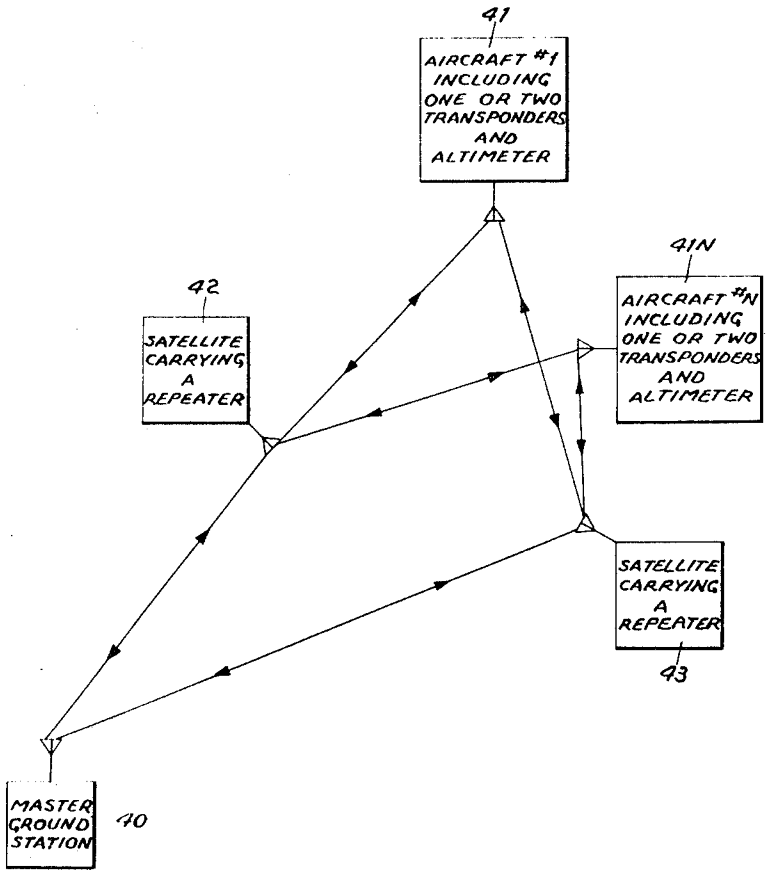

Patented June 26, 1973 3,742,498

4 Sheets-Sheet 1

INVENTOR
JAMES G. DUNN
BY Alfred C. Hill
AGENT

Patented June 26, 1973 3,742,498

4 Sheets-Sheet 2

INVENTOR
JAMES G. DUNN
BY
Alfred C. Hill

Patented June 26, 1973 3,742,498

4 Sheets-Sheet 3

INVENTOR
JAMES G. DUNN
BY Alfred C. Hill
AGENT

Patented June 26, 1973

3,742,498

4 Sheets-Sheet 4

INVENTOR
JAMES G. DUNN
BY
Alfred C. Hill
AGENT

SYNCHRONIZATION AND POSITION LOCATION SYSTEM

BACKGROUND OF THE INVENTION

This invention relates to communication systems and more particularly to communication systems whereby a plurality of stations gain access to and communicate through a common propagation medium, such as a common repeater.

Multiple access communication systems have been utilized for many years to achieve multiple access to long distance telephone trunk systems. In addition, this multiple access technique is applicable to other communication systems including, but not necessarily restricted thereto, (1) supervisory control systems to enable supervision, from a fixed common repeater or, from a central station through the common repeater, of the activities of the plurality of mobile stations, (2) remote control systems to enable control, from a fixed common repeater, or from a central station through the common repeater, of various responsive devices contained in a plurality of mobile stations, (3) communication systems to establish, maintain and/or enable communication between a fixed common repeater, or a communication center coupled to the fixed common repeater, and a plurality of mobile stations, such as is necessary between an airport control tower and a plurality of airliners, and between a dispatcher communication center and a fleet of taxicabs, emergency vehicles and cargo carrying trucks, and (4) a communication satellite system to enable a plurality of fixed or mobile slave stations to utilize a common repeater carried by an orbiting satellite.

In providing the multiple access for the various systems above set forth, different techniques have been employed in the past. One such technique is the so called "random access" technique to enable a plurality of stations to have access to and communicate through a common repeater on an undefined basis, namely, a random basis. Another such technique to permit achieving of multiple access is in the employment of frequency division multiplex techniques wherein each of the plurality of stations employs a different carrier signal and wherein the common repeater has a bandwidth capable of handling all of the different frequency carriers and the intelligence carried thereon. Still another technique enabling multiple access to a common repeater has been by the employment of time division multiplex (TDM) techniques wherein each of the plurality of stations are assigned to, or are capable of selecting, a time slot in a TDM frame or format at the common repeater to thereby permit communication through the common repeater in a non-interferring relationship. In multiple access systems employing TDM techniques, it is mandatory that there be a strict time synchronization so that each of the plurality of stations transmit their intelligence in a different one of a plurality of time slots of a TDM format and be so confined to that time slot selected for a particular station that its communication will not interfere with the communication of other stations in adjacent time slots of the format.

The multiple access systems employing TDM techniques have used both analog modulation, such as pulse amplitude modulation and pulse position modulation, and digital modulation, such as pulse code modulation and delta modulation. The general trend is for pulse code modulation or delta modulation signals because of simplicity of radio equipment and efficiency of transmission in a power limited environment, such as may be encountered in satellite communication systems.

In TDM multiple access systems, it has in the past, been the practice for the common repeater to receive a number of independent carrier signals and by computation equipment carried in the repeater would interleave the independent carrier signals bit by bit in a continuous sequence. This arrangement requires considerable equipment in the repeater itself and, therefore, particularly where the repeater is mobile, such as in satellite communication systems and the like, there would result a weight problem for the vehicle carrying the repeater equipment and with respect to a satellite carrying the repeater equipment an increase in the cost of a launch vehicle to place the satellite in a desired orbit.

In prior art TDM multiple access systems, such as described in U.S. Pats. No. 3,320,611 and 3,418,579 and Belgium Pat. No. 669,318, there is described an arrangement enabling a reduction in the hardware required in the repeater and, hence, a reduction in the problem of providing a vehicle to carry this repeater. By removing the TDM equipment from the repeater itself, it is possible to use a simple clipper amplifier or hard limiting repeater.

It has been found, in addition, that the pulse or bit by bit interleaving imposes considerable equipment problems in the plurality of stations requiring access to the common repeater. This complexity can be overcome, or at least materially reduced where the interleaving at the repeater is performed on bursts of pulses from each station.

Where there is relative movement between the common repeater and the plurality of stations, whether it is the repeater that is moving, or the stations that are moving, or both the repeater and stations moving relative to each other, it is necessary, where TDM techniques for multiple access to the common repeater are employed, to provide in some manner the range information between the station considered and the common repeater on a continuous basis. In the above cited prior art patents, this range information was obtained from a computer or like device contained in each of the plurality of stations which provide information of the relative location of and range between the common repeater and the considered one of the plurality of stations where the programming of the computer is based upon predicted relative movement between the common repeater and the considered station. The total inaccuracy of the range prediction with the elementary equipment has been determined to be in the order of 1 microsecond. Hence, the system timing format was developed having a one microsecond guard band between transmission from each station and the next adjacent station in the format. To realize reasonable efficiency of utilization of the common repeater, each station burst interval must be long in comparison to this guard band, hence, a burst of 125 microseconds was established. Thus, each station must have equipment to store communication traffic for a short period of time and transmit this in a 125 microsecond burst. The repetition interval and, consequently, the required storage time is the product of the burst length and the number of simultaneous uses for which the multiple access system has been designed.

In a first copending application of W.L. Glomb et al, Ser. No. 712,658, filed Mar. 13, 1968, now U.S. Pat. No. 3,532,985 and in a second copending application of J.G. Dunn et al, Ser. No. 749,121, filed July 31, 1968, now U.S. Pat. No. 3,593,138 continuous range information is provided by means of a pseudo noise code signal transmitted from each of the stations through the repeater with the equipment in each of the slave stations responding to its associated pseudo noise code signal to adjust the timing signals therein to account for changing range between the slave station and the common repeater. In the first copending application, the control of the timing signals is performed solely in a digital manner, while in the second copending application, the control of the timing signals is performed in an analog and digital manner.

SUMMARY OF THE INVENTION

An object of the present invention is to provide a TDM multiple access system of the types described above employing a synchronization system of an improved nature relative to the previously employed TDM multiple access system and particularly improved with respect to the first and second copending applications cited hereinabove.

Another object of the present invention is to provide a synchronizing system for a TDM multiple access system wherein the pseudo noise ranging equipment is located in a ground station which transmits the phase information obtained from the pseudo noise code signal from the ground station to the appropriate one of the slave stations, said transmitted phase information then being employed in the slave stations to adjust the timing signals thereof.

Still another object of this invention is to provide a synchronizing system for a TDM multiple access system that reduces the equipment employed in the slave stations and is applicable to an air traffic control system, the slave stations being the aircrafts over which control is desired.

A further object of this invention is to provide a synchronizing system for a TDM multiple access system wherein the range information for the ground station to satellite, as provided by the master sync signal, and the range information from the slave station to the satellite as provided by the pseudo-noise code ranging signal at the ground station is employed to indicate at the ground station the range between the common satellite and the appropriate one of the slave stations, thereby providing a combined communication and distance measuring system.

Still a further object of this invention is to provide in conjunction with a synchronizing system for a TDM multiple access system the above mentioned range information at the ground station and other significant information, such as the altitude of the aircraft and the rate of change between the common repeater and the appropriate aircraft, to provide at the ground station position location of the aircraft.

Still another object of this invention is to provide in combination with the above mentioned synchronizing system for a TDM multiple access system. A second common satellite repeater with a duplication of the equipment in the master station and the slave stations to provide at the ground station the range information from the first satellite to a given aircraft and from the second satellite to said given aircraft and the altitude information of said given aircraft to provide the position location of said given aircraft.

A feature of the present invention is a time division multiple access synchronization system to control the transmission of signals from each of a master station and N slave stations to be propagated through at least one common repeater in a selected one of M time slots of a time division multiplex frame format at the repeater, the stations and the repeater having relative motion therebetween, where N is an integer greater than one and M is an integer greater than one but less than N and an even multiple of N comprising: first means disposed in the master station to transmit a master sync burst through the repeater in one of the time slots; second means disposed in the master station responsive to the master sync burst from the repeater to control the production of timing signals employed to control the time of transmission of the master sync and others of the transmitted signals from the master station; third means disposed in each of the slave stations responsive to the master sync from the repeater to control the production of timing signals employed to control the time of transmission of the transmitted signals from the associated one of the slave stations; fourth means disposed in each of the slave stations coupled to the associated one of the third means to transmit a ranging signal through the repeater in its associated one of the time slots; fifth means disposed in the master station coupled to the second means to detect the phase information in the ranging signal received from the associated one of the slave stations through the repeater; sixth means disposed in the master station coupled to the second and fifth means to transmit the phase information through the repeater in the associated one of the time slots to the associated one of the slave stations; and seventh means disposed in each of the slave stations coupled to said third means responsive to the phase information pertaining to the associated one of the slave stations to adjust the phase of the timing signals produced by the third means so that the time of transmission of the transmitted signals from the associated one of the slave stations is such that the transmitted signals occur in the proper one of the time slots at the repeater.

Another feature of this invention is the provision of eighth means disposed in the master station coupled to the above mentioned second means and fifth means to measure and provide an indication of the range between the repeater and the associated one of the slave stations.

A further feature of this invention is the provision of additional equipment aboard each of the slave stations and in the master station to obtain sufficient information which together with the range information obtained by the above mentioned eighth means enables the location of the position of the associated one of the slave stations.

BRIEF DESCRIPTION OF THE DRAWINGS

The above-mentioned and other features and objects of this invention will become more apparent by reference to the following description taken in conjunction with the accompanying drawings, in which.

DESCRIPTION OF THE PREFERRED EMBODIMENTS

Figure 1:
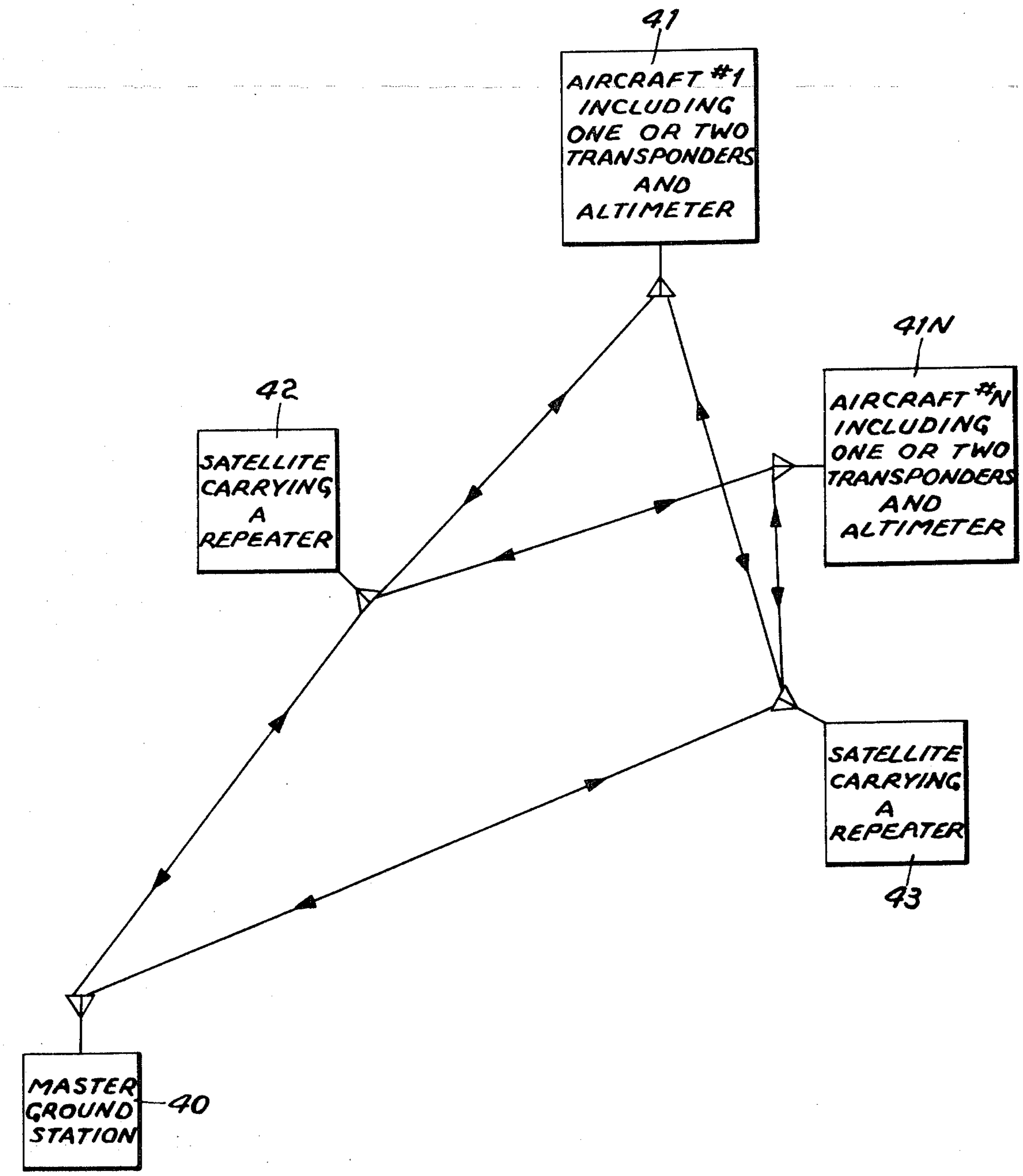
FIG. 1 is a block diagram illustrating the multiple access system in accordance with the principles of this invention capable of both communication between the slave stations and the master station and also position location of the slave stations.

Referring to FIG. 1, there is illustrated therein a block diagram of a TDM multiple access communication system capable of being employed in an air traffic control system which requires position location of the aircraft as well as two way communication between the master station 40 and the plurality of slave stations, such as aircrafts 41 to 41N through a common repeater carried by satellite 42.

While the description of the invention will be carried forth relating to air traffic control, it is to be understood that the synchronization system for the required TDM multiple access system may be employed in any TDM multiple access system where the slave stations may be fixed ground stations, ocean going vessels, or any of the other applications outlined hereinabove under the heading "Background of the Invention".

In the TDM multiple access communication system of this invention each of the stations 40 and 41–41N transmit data bursts which are timed to arrive at repeater 42 in a non-interfering relation relative to bursts from other stations. The phase or timing of the transmitted signals must be adjusted to compensate for the difference in range between the repeater of satellite 42 and the various aircraft 41–41N. Where there is motion between repeater 42 and stations 41–41N, as will be the case in an air traffic control system, the range is continuously changing and the continuous phase adjustment results in a frequency offset, namely, the doppler effect which is proportional to the rate of change of range.

As in the case of the first and second copending applications, master station 40 transmits a master or reference sync burst through satellite 42 to each of the aircrafts 41–41N. Each of the aircraft then transmits a different pseudo noise code ranging signal which in the first and second copending applications were received back at the corresponding aircraft from the repeater carried in satellite 42. However, in accordance with the present invention these ranging signals are transmitted from each of the aircrafts through the repeater carried by satellite 42 and received at the master station 40. The master station 40, in turn, receives the master sync signal from the repeater of satellite 42. The phase difference between the transmitted master sync and the master sync received from satellite 42 is a measure of the range between satellite 42 and ground station 40. The difference in phase, at station 40, between the received master sync and the received pseudo noise ranging code signal for a particular aircraft indicates not only the necessary timing to properly synchronize the transmission from the aircraft, but also the range from the aircraft to the satellite. This range information together with a rate of change information obtained at the aircraft and the altitude of the aircraft enables position location of that particular aircraft. The phase or timing information contained at the ground station, as derived from the pseudo noise code ranging signal, is transmitted as will be explained hereinbelow through the repeater of satellite 42 to the particular one of the aircraft 41–41N to enable the adjustment of the transmit timer contained in the aircraft to assure that the transmission bursts from that particular aircraft occur in the proper time slot of the TDM frame format.

Figures 2, 3:
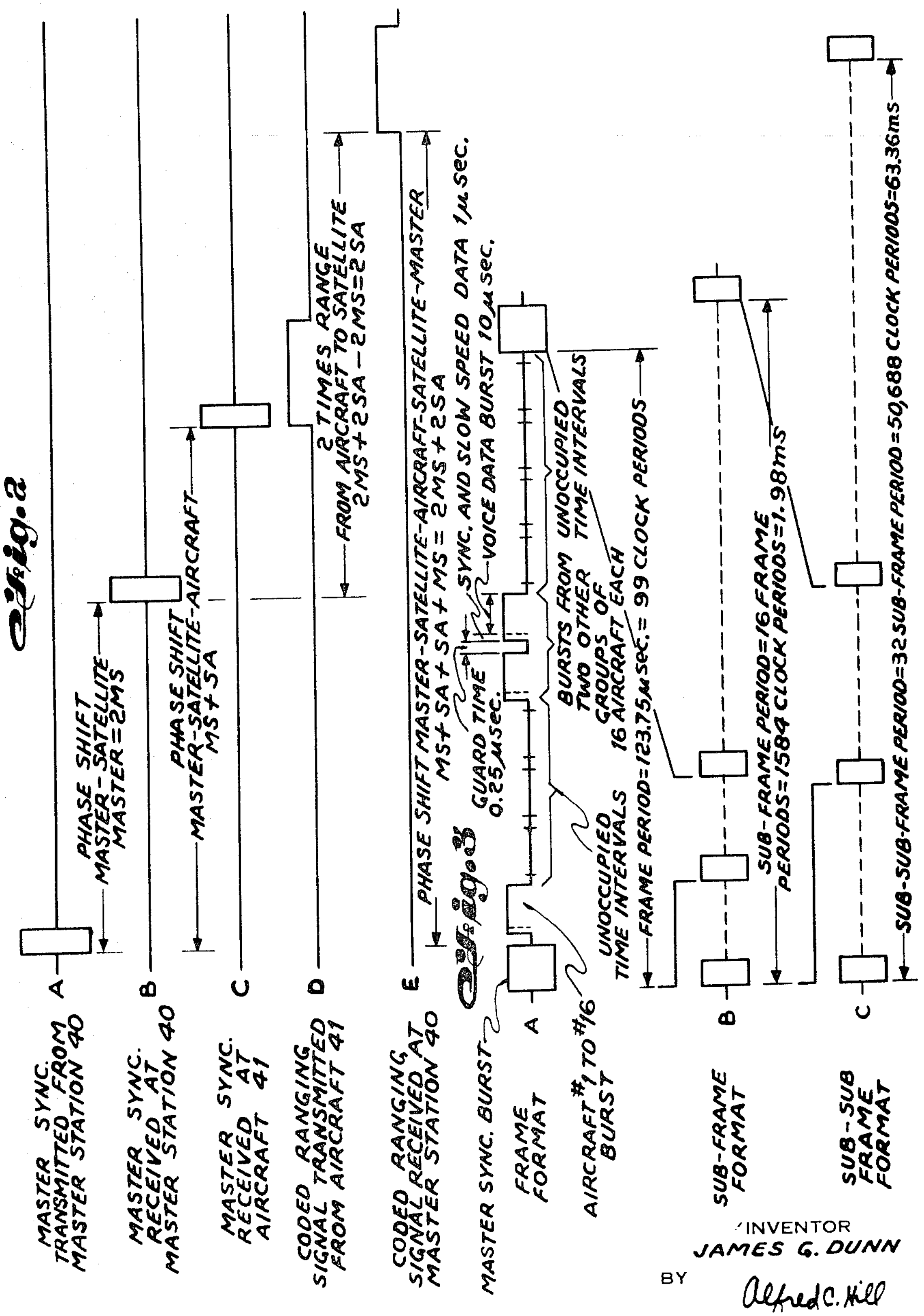
FIG. 2 is a timing diagram illustrating how the master station obtains the necessary phase information to provide a desired measurement of range or distance between the common repeater and an associated one of the slave stations.
FIG. 3 is a timing diagram illustrating the formats employed in the multiple access system in accordance with the principles of this invention.

The information previously discussed immediately above is illustrated in FIG. 2 wherein Curve A illustrates the master sync transmitted from station 40 and Curve B illustrates the master sync received at station 40 from the repeater of satellite 42. The phase difference between Curves A and B provide range information, namely, a range equal to twice the range of station 40 to satellite 42. Curve C illustrates the master sync as received at the particular one of the aircrafts 41–41N and Curve D illustrates the coded ranging signal transmitted from that particular aircraft. Curve E illustrates the coded ranging signal received at station 40 and as is illustrated contains phase information related to a range equal to twice the distance from station 40 to satellite 42 and from satellite 42 to the particular one of aircrafts 41. Subtracting the range information contained in Curve B from the range information contained in Curve E, there is obtained directly a range equal to twice the range of particular aircraft 40 to satellite 42. This range information as detected in station 40 can be appropriately operated upon by a division factor of two to obtain directly the satellite-to-aircraft range and, thereby, provide one bit of information necessary for the position location of the aircraft being considered.

As previously pointed out, the first and second copending applications provide one form of synchronization of the transmitted signals from the slave stations to be received in the proper time slot of the TDM frame format at the repeater. As described herein, the first and second copending applications are modified by the fact that the pseudo noise code ranging signal is transmitted through the satellite repeater to the master station wherein the range measurement takes place. In a one satellite system, position location can be provided by this range or distance measurement together with the aircraft altitude and the rate of range change at the aircraft. The rate of range change must be obtained at the aircraft and transmitted to ground, since the doppler compensation in the ground station and the aircraft equipment compensates the transmitted signals so that the true transmitted frequency appears at the repeater, that is, the frequency received at the repeater from the ground station and from the aircraft has no doppler shift.

Figure 4:
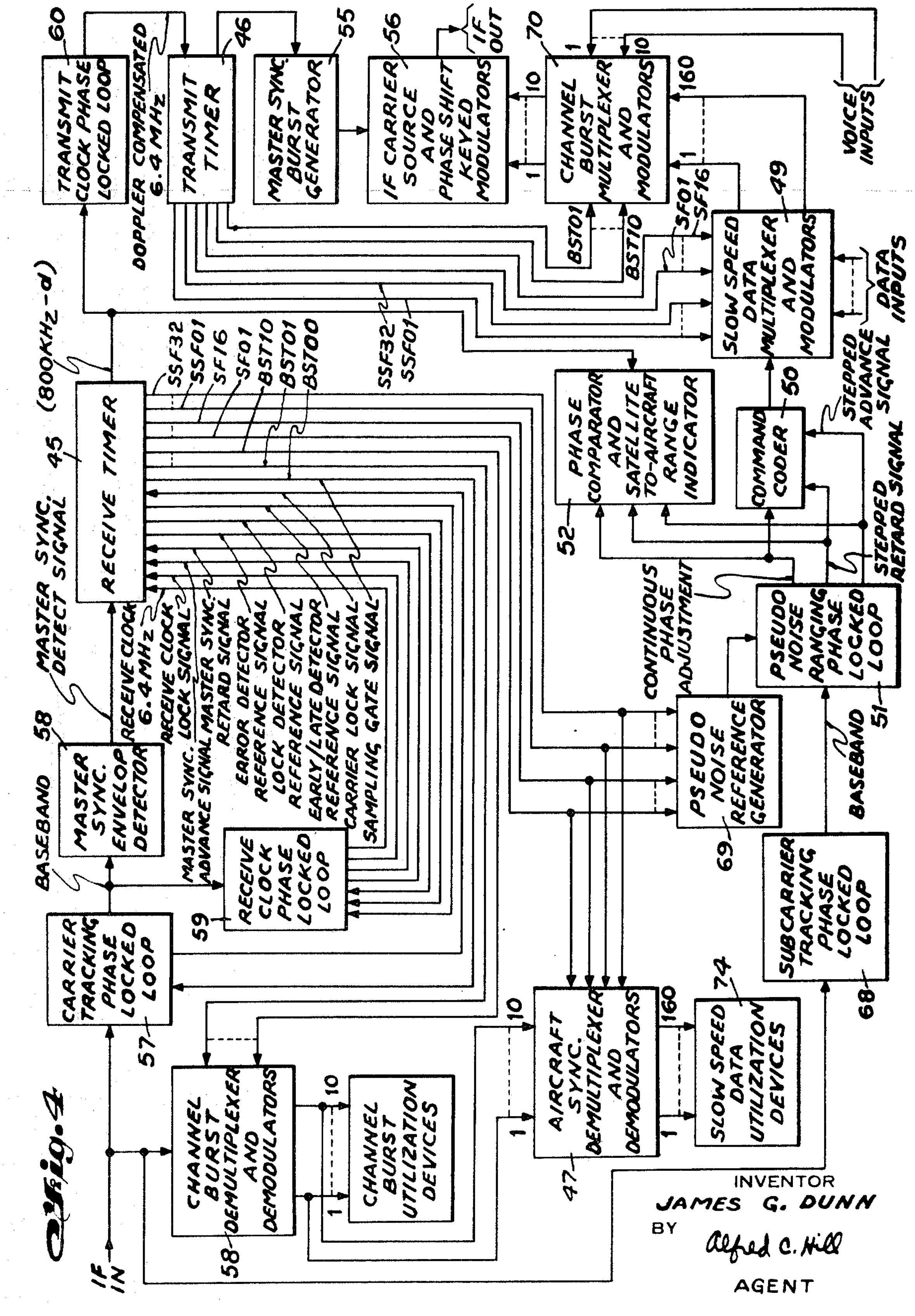
FIG. 4 is a block diagram illustrating the equipment contained in the master station.
Figure 5:
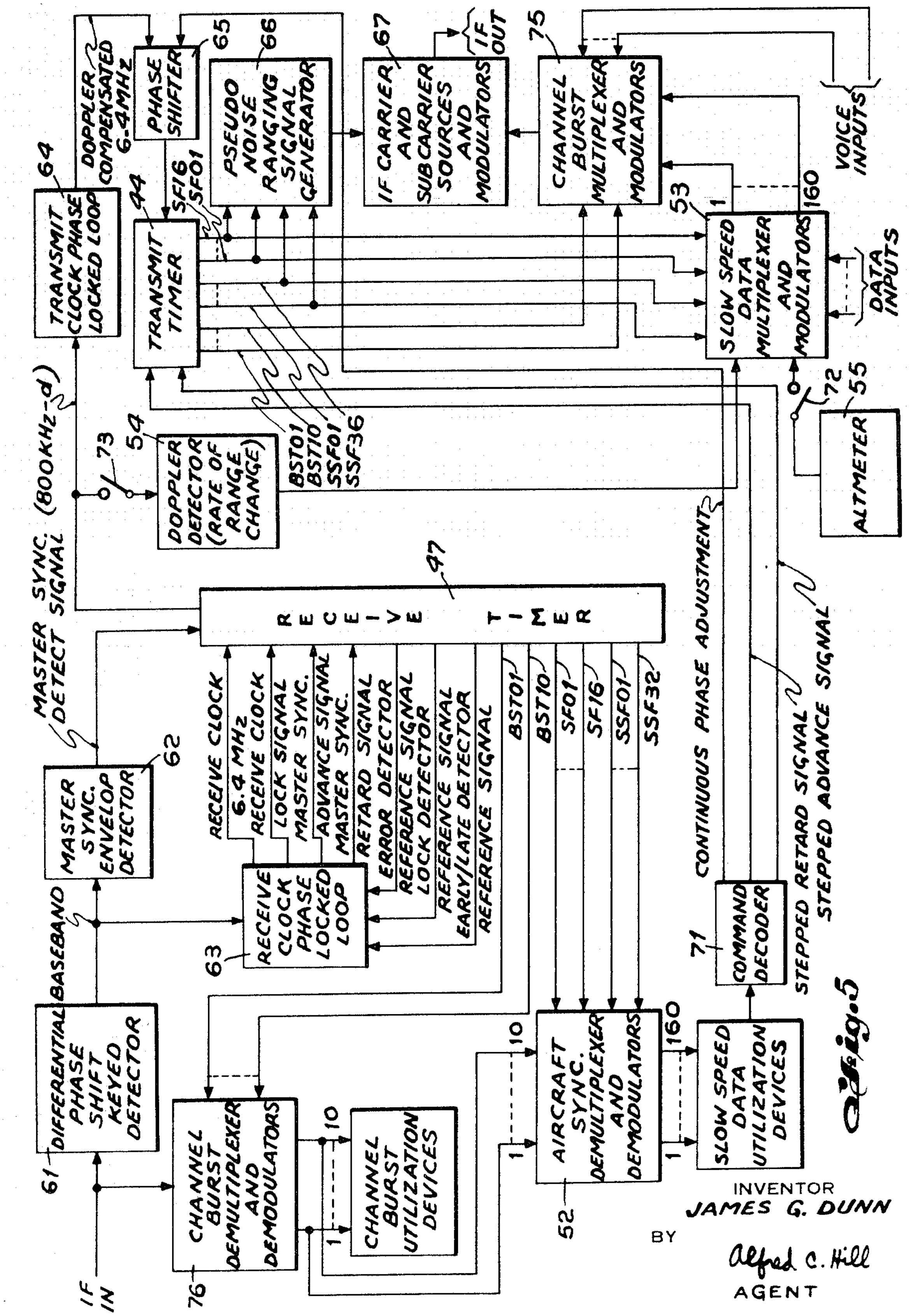
FIG. 5 is a block diagram of the equipment contained in each of the slave stations or aircrafts.

Another position location arrangement utilizing the synchronization techniques described herein employs a two satellite system each of which carries a repeater, such as satellite 42 and satellite 43 of FIG. 1. The equipment of the master station as shown in FIG. 4 and the equipment in the aircraft as shown in FIG. 5 are duplicated in the master station and the aircraft for cooperation with the second satellite 43 to provide a second range measurement. This second range measurement together with the first range measurement and the aircraft altitude will enable the position location of the aircraft at the ground station.

As disclosed in the above-mentioned first and second copending applications, synchronization was maintained by designating one station as the master which transmits a reference or master burst to the satellite with the remaining stations being designated as slave stations which time their bursts relative to the phase of the reference bursts. In an air traffic control system as disclosed in the present application master station 40 is the controlling ground station and the slave stations are the aircrafts 41–41N. In the first and second copending applications, the master and slave stations were essentially on an equal footing as regard size, power and complexity. In the present application, the controlling master station 40 has a considerably larger antenna, radiates higher power and is much more complex. The equipment complexity aboard aircrafts 41–41N is minimized in accordance with the principles of the present invention.

As in the first and second copending applications, the slave stations maintain synchronization by measuring their range to the satellite. This is done by sending a pseudo-noise code ranging signal, or the like, to the satellite and measuring the phase difference between the returned ranging signal and the received reference or master sync burst. The phase of the transmitted burst is adjusted until the return ranging signal has the desired phase relation with respect to the reference signal for maintaining synchronization. Range is determined by the relative phase of the transmitted and received ranging signals.

It has been discovered, however, and is described in the present application that the ground station can measure the relative phases of the reference or master sync burst and the aircraft ranging burst as received from the satellite. In fact, because master station 40 has a large antenna and a lower noise receiver, it can measure relative phase much better than the aircrafts can. Also, by processing the phase information at master station 40, the equipment required on the aircraft is greatly simplified. Thus, the basic function of the aircraft transponder in the system of the present application is to transpond the reference burst.

As mentioned hereinabove, position location can be enhanced if an independent range rate measurement can be made in addition to the basic range measurement. This may be accomplished by measuring the doppler on the microwave carrier as received at the aircraft and transmitting this information to the ground station for utilization therein for obtaining the location of the associated aircraft. This presents a problem in the frequency division system because the doppler correction is applied to the transponded signal to reduce the guard band between different frequency assignments. No such problem exists in a TDM multiple access system, however, since the received carrier frequency can be transponded coherently after doppler compensation to obtain directly a measure of the doppler effect.

Referring to FIG. 3 there is illustrated therein the formats employed in the system of the present application which is a modification of the format employed in the first and second copending applications. The values illustrated in FIG. 3 and mentioned hereinafter in the specification are only for purposes of example and it will be obvious that many variations in the values and the format are possible depending on specific system requirements.

Curve A, FIG. 3 illustrates the frame format which includes a master sync burst of 11 microseconds and M time slots, where M = 10, for access to the repeater. The guard time between adjacent time slots amount to 0.25 microseconds and the time slot is divided into two intervals, a synchronizing and slow speed data burst interval of 1 microsecond and a voice data burst interval of 10 microseconds. The format of Curve A, FIG. 3, is derived from an 800khz (kilohertz) clock which has a period of 1.25 microseconds. This clock is divided by 9 to generate a time interval of 11.25 microseconds, the interval of the time slots. Eight of the nine clock periods define a burst of 10 microseconds duration (the voice data burst interval) and the ninth clock period was previously allotted for a 1.25 microsecond guard time. The output of the divide by 9 is next divided by 11. This generates a frame period which has a duration of 99 clock periods equal to 123.75 microseconds and contains 11 burst intervals or time slots (the eleventh time slot being occupied by that master sync burst).

It is assumed that each aircraft is assigned to a particular time slot of the frame format and that up to 16 aircraft share this time slot with the ground station on a push-to-pull basis. This number is arbitrary and is used for illustration only. Thus, for this illustration N would be equal to 160, the number of aircraft that can employ the TDM multiple access system of this invention. It is also necessary for each aircraft to continuously use its particular time slot for sync maintenance and ranging. This is readily accomplished by first dividing the time slot into two subintervals; one for sync and slow speed data and one for high speed data. For example, 10 microseconds are allotted for voice data transmission and 1 microsecond of the previous 1.25 microsecond guard time for sync maintenance, ranging and slow speed data transmission.

Now, the 10 microsecond voice data time will be used on a push-to-talk basis by a single aircraft or the ground station at any one time. Assuming that sync is maintained, the ten microsecond data signal requires no further discussion.

The frame format of Curve A is further subcommutated so that N/M = 16 frames are defined as one sub-frame. This is illustrated in Curve B and the subcommutation only applies to the one microsecond subintervals. Recalling that one frame equals 99 clock periods, a sub-frame equals 1584 clock periods which has a duration of 1.98 milliseconds. Each aircraft 41–41N will transmit a one microsecond sync pulse once each sub-frame.

To define a sub-frame to all aircraft, station 40 must modify its sync signal to result in a basic period of one sub-frame. Actually, to remove range ambiguity, the format must be further subcommutated as discussed below. This will require a sync signal whose basic period is as low as the lowest repetition frequency of the final format.

The ranging signal is initially transmitted at much lower power than the master sync or data bursts. For instance, the ranging signal should be transmitted at 10 or 20 db (decibels) less than the sync or data bursts. The signal suppression effect of a hard limiting satellite repeater will further reduce this level if it happens to be transmitted at the wrong time and intefers with a normal level signal. On the other hand, when the ranging signal falls in its proper time slot, it will saturate the satellite repeater limiter and transmits full satellite power. In this manner interference due to ranging during initial acquisition is avoided.

Initial acquisition is obtained by one of the aircrafts 41–41N transmitting, at a low power, its 1 microsecond sync signal at an arbitrary time in the format; that is, the transmit timer 44 of FIG. 5 is initially not in correct phase. The acquisition results from stepping the phase of transmit timer 44 until the return falls in the assigned time slot. This search will take a maximum time of 1584 times the maximum round trip propagation delay to the satellite. If this twice round trip delay is approximately one-half second, the maximum acquisition time would be 13.2 minutes.

To reduce this time, a three step ranging process would be more desirable. During the first step, a low level 10 microsecond ranging signal is transmitted. The transmit timer 44 can now be sleeved in 10 microsecond steps which requires only 6 seconds to search a frame. This coarse search is completed when the 10 microsecond ranging pulse is received during the one microsecond data sync sub-interval assigned to the aircraft.

The coarse search is followed by the fine search, transmitting a low level 1 microsecond ranging signal every frame instead of once every sub-frame. Acquisition of this pulse is frame sync and the aircraft can begin transmitting its one microsecond ranging pulse during its normally assigned 1 microsecond sync sub-interval, but still at low level. The third step consists of a search of the 16, 1 microsecond sync sub-intervals in the sub-frame. The entire acquisition time thus does not exceed about 20 seconds.

Once the acquisition is completed, it immediately defines the range of aircraft to the satellite in modulo 160 nautical miles determined by the period of a sub-frame. This information is contained in the relative phases of the receive and transmit timers 45 and 46 of the ground station as shown in FIG. 4. The resolution of this range measurement can be very high because a narrow one microsecond pulse is being used to make the measurement. After acquisition, the range ambiguity is resolved by subcommutating a code on the one microsecond sync pulse. Sync is maintained by correcting the phase of the transmit timer 44 (FIG. 5) based on a phase error measurement at ground station 40. A further subcommutation of 32 to 1 as illustrated in Curve C, FIG. 3 would make the range ambiguity more than sufficient (5120 nanometers). This requires another 16 seconds of acquisition time to search these 32 time slots. The sub-commutation consists of modulating a 32 bit binary code on the sync pulse, each sync pulse carrying one bit of this code. The following describes a means for using the code to resolve the range ambiguity.

Assuming a final sub-commutation of 32 to 1 as mentioned above, the transmit and receive timers in ground station 40 and in aircrafts 41–41N as shown in FIGS. 4 and 5 will each have a series of counters to divide 800 khz clock frequency down to 50.8 hz (hertz). It requires 20 bits to specify this date of one of these timers;

| Divide by | Period | Number of bits |
|---|---|---|
| 8 | 1.25 microsec. | 3 |
| 9 | 11.25 microsec. | 4 |
| 11 | 123.75 microsec. | 4 |
| 16 | 1.98 millisec. | 4 |
| 32 | 63.4 millisec. | 5 |
| | Total | 20 |

The divide by 8 is used to derive the 800 khz clock from a 6.4 mhz (megahertz) clock to give a final time resolution of 156 nanoseconds which corresponds to a final, one-way range resolution within 25 meters. The receive timer in the aircraft (FIG. 5) is locked in phase to the received reference burst. The phase of the transmit timer 44 (FIG. 5) is controlled by the ground station based on the phase error measurement made by ground station 40. This is done by commands from the ground station on a slow speed data channel.

Now assume that the aircraft transmits the state of its received timer at the instant that the transmit timer is in some specific initial state. This will require 20 bits and, as discussed, is a direct measurement of the range from aircraft to satellite.

These 20 bits are transmitted once each 32.4 milliseconds in the form of binary modulation of 20 of the 32 sync pulses transmitted by the aircraft during that period. The remaining 12 sync bits are used to convey the phase information from the ground station to the aircraft, the altitude information from the aircraft to ground station and the rate of range change from the aircraft to the ground station and other telemetry data as required.

Referring to FIGS. 4 and 5, there is illustrated therein in block diagram form the equipment contained in station 40 and the equipment contained in each of the aircrafts 41–41N. This equipment is described in detail, both as to components and function thereof, in the above-mentioned second copending application. The only modification necessary that is not described and illustrated in said second copending application is the addition in the receive timer 45 and transmit timer 46 of station 40 of the divide by 16 and divide by 32 counters to provide the sub-frames and sub-sub-frames of FIG. 3, the aircraft sync demultiplexer and demodulator 47 operated upon by these extra timing signals from timer 45, the slow speed data multiplexer and modulators 49 operated upon by these extra timing signals from timer 46, command coder 50 responsive to the output of pseudo-noise ranging phase locked loop 51 and the phase comparator and satellite-to-aircraft range indicator 52. In aircrafts 41 the additional equipment include the additional dividers by 16 and 32 in receive timer 47 and transmit timer 44 used to operate aircraft sync demultiplexer and demodulators 52 and slow speed data multiplexer and modulators 53 and the doppler detector 54 together with altimeter 55.

Transmit timer 46 activates the master sync burst generator 55 to excite the IF carrier source and (intermediate frequency) and phase shift keyed modulators 56 whose output is modulated upon the RF (radio frequency) carrier in the high frequency portion of the transmitter of the ground station 40. Thus, the master sync burst is transmitted to the repeater of satellite 42 and to each of the aircrafts 41–41N. The return master sync burst from the repeater of satellite 42 is down converted to an IF signal and coupled to carrier tracking phase locked loop 57, which in combination with master sync envelope detector 58 and receive clock phase locked loop 59 operate upon receive timer 45 for timing adjustment of the various dividers therein to produce the (800 khz– *d*), where *d* is the doppler shift. This signal is then coupled to transmit clock phase locked loop 60 to provide a doppler compensated 6.4 mhz output for adjusting transmit timer 46 to account for the range between ground station 40 and satellite 42 so that the master sync of generator 55 occurs in the proper time slot at satellite 42.

Referring to FIG. 5, receive timer 47 and transmit timer 44 are in an aircraft and the master sync burst from ground station 40 is coupled to differential phase shift keyed detector 61 which replaces the carrier tracking phase locked loop previously employed in the second copending application. Detector 61 together with master sync envelope detector 62 and receive phase locked loop 63 operate upon receive timer 47 to adjust the timing of the signal therefrom for the received master sync burst which provides a (800 khz – $d$) input to the transmit clock phase locked loop 64 which then is coupled through phase shifter 65 to initially time the outputs of transmit timer 44. Transmit timer 44 then activates the pseudo-noise ranging signal generator 66 to produce its particular pseudo-noise code ranging signal for application to the IF carrier and sub-carrier sources and modulators 67 for application to the RF portion of the aircraft transponder. The pseudo-noise code signal from a particular aircraft is received on the IF input of FIG. 4 and applied to the channel burst demultiplexer and demodulator 58 and the sub-carrier tracking phase locked loop 68 to track the subcarrier and provide an input for the pseudo-noise ranging phase locked loop 51 which contains therein among other things, as illustrated and described in the second copending applications, correlators activated by pseudo-noise reference generator 69 to recover the phase information contained in the received pseudo-noise code signal. This phase information is then coded in command coder 50 and applied to the modulators 56 through means of the slow speed data multiplexer and modulators 49 and channel burst multiplexer and modulators 70 to provide the necessary phasing information for recovery in the aircraft sync demultiplexer and demodulator 52 for application through the proper demodulator of demodulators 52 to command decoder 71 which reproduces the phasing information detected at station 40 for control of transmit timer 44 through the means of phase shifter 64 in a continuous fashion and directly to appropriate ones of the binary counters of transmit timer 44 by means of the step retard and advance signals. This control of timer 44 properly times the various timing signal outputs so that the transmission from this particular aircraft occur in the proper time slots.

The information from the pseudo-noise ranging phase locked loop 51 is also coupled to phase comparator and satellite-to-aircraft range indicator 52 whose other input is coupled to the output of receive timer 45. Comparator and indicator 52, for example, may include a meter or other appropriate measuring arrangement to provide a direct measure of the satellite-to-aircraft range appropriately sealed to eliminate the factor of 2 illustrated in FIG. 2. Comparator and indicator 52 measure the phase difference between the two input signals thereto and provide directly the satellite-to-aircraft range.

The output of command coder 50 and other telemetry data inputs are applied to the slow speed data channels provided by the one microsecond sync interval as described in connection with FIG. 3. The command decoder 71 receives its input from the proper one of the one microsecond sync intervals forming the slow speed data channels from demuliplexer and demodulator 52. In a well known manner, the output from demodulator 52 associated with the particular aircraft under consideration is gated to the input of command decoder 71 as selected by switches or other devices by the operator of the equipment.

Now that range measurement has been obtained, position location can be obtained in a one satellite system by closing switch 72 so that the value of the altitude is applied to one of the slow speed data channels and by closing switch 73 so that doppler detector 54 can provide at its output the rate of range change for application to still another slow speed data channel for transmission to the ground station which information is recovered in the slow speed data utilization devices 74 through the intermediary of demultiplexer and demodulators 47. Thus, with the altitude and rate of range change present in a given one of the output devices 74 and the range indication in device 52, it is possible to locate the position of the aircraft under consideration.

In a two satellite system, the equipment of FIGS. 4 and 5 would be duplicated and a second satellite 43 would be associated with this duplicated equipment as discussed with respect to FIG. 1. In this arrangement, the two range measurements, one with respect to satellite 42 and the other with respect to satellite 43 together with the altitude information obtained from altimeter 55 with switch 72 closed would enable the location of the aircraft under consideration. In this arrangement the doppler detector 54 would be inactivated by opening switch 73.

In addition to the slow speed data channels, voice or high speed data can be provided by the employment of multiplexer and modulators 70 and demultiplexer and demodulator 58 of the ground station as illustrated in FIG. 4 and multiplexers and modulators 75 and demultiplexer and demodulator 76 of the aircraft equipment as illustrated in FIG. 5.

While I have described above the principles of my invention in connection with specific apparatus, it is to be clearly understood that this description is made only by way of example and not as a limitation to the scope of my invention as set forth in the objects thereof and in the accompanying claims.

I claim:

1. A time division multiple access synchronization system to control the transmission of signals from each of a master station and N slave stations to be propagated through at least one common repeater in a selected one of M time slots of a time division multiplex frame format at said repeater, said stations and said repeater having relative motion therebetween, where N is an integer greater than one and M is an integer greater than one but less than N and an even multiple of N, first means disposed in said master station to transmit a master sync burst through said repeater in one of said time slots;

second means disposed in said master station responsive to said master sync burst from said repeater to control the production of timing signals employed to control the time of transmission of said master sync and others of said transmitted signals from said master station;

third means disposed in each of said slave stations responsive to said master sync from said repeater to control the production of timing signals employed to control the time of transmission of said transmitted signals from the associated one of said slave stations;

fourth means disposed in each of said slave stations coupled to the associated one of said third means to transmit a ranging signal through said repeater in its associated one of said time slots;

fifth means disposed in said master station coupled to said second means to detect the phase difference between said master sync burst from said repeater and said ranging signal received from said associated one of said slave stations through said repeater;

sixth means disposed in said master station coupled to said second and fifth means to transmit said phase difference through said repeater in said associated one of said time slots to the associated one of said slave station; and seventh means disposed in each of said slave stations coupled to said third means responsive to said phase difference pertinent to the associated one of said slave stations to adjust the phase of said timing signals produced by said third means so that said time of transmission of said transmitted signals from the associated one of said slave stations is such that said transmitted signals occur in the proper one of said time slots at said repeater.

2. A system according to claim 1, further including eighth means disposed in said master station coupled to said second means and said fifth means responsive to said master sync burst from said repeater and said ranging signal received from said associated one of said slave stations through said repeater to measure and provide an indication of the range between said repeater and said associated one of said slave stations.

3. A system according to claim 1, wherein said ranging signal includes a low power level pseudo noise code signal.

4. A system according to claim 1, wherein each of said time slots of said frame includes a first interval for transmission of at least said ranging signal, and a second interval for data transmission;

N/M slave stations utilize said second interval of each of said time slots on a push-to-talk basis; and said second and third means produce first timing signals to define each of said time slots of said frame, and second timing signals to define at least N/M of said first interval of each of said time slots to enable synchronization of said N/M slave stations utilizing said second interval of each of said time slots on said push-to-talk basis.

5. A system according to claim 4, wherein said second and third means further produce third timing signals to define at least L of said N/M of said first interval of each of said time slots to enable X of said L of said N/M of said first interval of each of said time slots to provide said ranging signal in the form of a low power level pseudo noise type of code signal, where L is an integer greater than N/M but less than N and X is an integer greater than one but less than L.

6. A system according to claim 5, further including eighth means disposed in each of said slave stations coupled to said third means and ninth means disposed in said master station coupled to said second means to enable utilization of (X−1) of said L of said N/M of said first interval of each of said time slots as slow speed data channels between said master station and said slave stations.

7. A system according to claim 6, further including tenth means disposed in each of said slave stations coupled to said third and eighth means to detect the rate of change of range between said repeater and the associated one of said slave stations and to transmit said rate of change of range to said master station on a selected one of said slow speed data channels; and eleventh means disposed in each of said slave stations to determine the altitude thereof and to transmit said altitude to said master station on another one of said slow speed data channels.

8. A system according to claim 7, further including twelfth means disposed in said master station coupled to said second means and said fifth means to measure and provide an indication of the range between said repeater and the associated one of said slave stations; and thirteenth means disposed in said master station to provide an indication of said rate of change of range and said altitude;

said rate of change of range, said range and said altitude cooperating to locate the position of the associated one of said slave stations.

9. A system according to claim 6, further including a second common repeater;

duplication of said first through ninth means for operation with said second repeater;

tenth means disposed in each of said slave stations to determine the altitude thereof and to transmit said altitude to said master station on a selected one of said slow speed data channels;

eleventh means disposed in said master station coupled to said second means and said fifth means to measure and provide an indication of the first range between said first repeater and the associated one of said slave stations; and twelfth means disposed in said master station coupled to said duplicate second means and said duplicate fifth means to measure and provide an indication of the second range between said second repeater and said associated one of said slave stations;

said altitude, said first range and said second range cooperating to locate the position of said associated one of said slave stations.

10. A system according to claim 6, wherein said sixth means transmits said phase difference on a selected one of said slow speed data channels.

* * * * *